United States Patent
Thielman et al.

(10) Patent No.: US 9,481,414 B1
(45) Date of Patent: Nov. 1, 2016

(54) SPHERICAL TRACTOR OPERATING MOBILE PLATFORM

(71) Applicants: Gerhard W. Thielman, Fredericksburg, VA (US); Benjamin-Fausto S. Thielman, Fairfax, VA (US)

(72) Inventors: Gerhard W. Thielman, Fredericksburg, VA (US); Benjamin-Fausto S. Thielman, Fairfax, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/841,246

(22) Filed: Aug. 31, 2015

Related U.S. Application Data

(63) Continuation-in-part of application No. 14/263,529, filed on Apr. 28, 2014, now Pat. No. 9,152,148, which is a continuation of application No. 13/068,913, filed on May 4, 2011, now Pat. No. 8,768,548, which is a continuation-in-part of application No. 12/386,179, filed on Apr. 10, 2009, now Pat. No. 7,963,350.

(51) Int. Cl.
 *B62D 57/00* (2006.01)
 *G05D 1/00* (2006.01)
 *F41H 7/02* (2006.01)

(52) U.S. Cl.
 CPC ............... *B62D 57/00* (2013.01); *F41H 7/02* (2013.01); *G05D 1/0011* (2013.01); *Y10S 901/01* (2013.01)

(58) Field of Classification Search
 CPC ...... B62D 5/04; B62D 57/00; G05D 1/0011; A63B 19/02; A63H 30/04; A63H 33/005; G06F 7/00; G06F 17/00; G06F 19/00
 See application file for complete search history.

(56) References Cited

U.S. PATENT DOCUMENTS

| | | |
|---|---|---|
| 1,915,886 A | 6/1933 | Gutierrez |
| 2,107,766 A | 2/1938 | Rose ............................ 180/10 |

(Continued)

OTHER PUBLICATIONS

R. Chase et al.: "A Review of Active Mechanical Driving Principles of Spherical Robots", *Robotics*, 1 (2012). http://www.mdpi.com/2218-6581/1/1/3/pdf.

(Continued)

*Primary Examiner* — Thomas Tarcza
*Assistant Examiner* — Edward J Pipala
(74) *Attorney, Agent, or Firm* — Gerhard W. Thielm, Esq

(57) ABSTRACT

A spherical tractor operating mobile platform (STOMP) is provided for internally propelling and steering along an external surface. The STOMP includes a spherical shell having interior and exterior surfaces, an internal chassis containing an electrical power supply and a propulsion controller; a tractor drive system and an overhead wheel assembly. The tractor drive system provides propulsion and steering of the shell along the surface. The drive system includes a frame that connects to the chassis from below and contains a motor unit. The frame includes port and starboard sides that support respective wheel sets surrounded by corresponding continuous tracks. These tracks engage the shell's interior surface. Each wheel set includes a drive wheel, an idler wheel and a tension wheel for engaging a corresponding track. The overhead wheel assembly connects to the chassis from above to maintain the chassis and the drive system in compression with the shell. To propel the shell, the propulsion controller commands the motor unit to provide torque to both the port and starboard drive wheels. For steering the shell towards starboard, the motor provides torque to the port drive wheel. For steering the shell towards port, the motor provides torque to the starboard drive wheel.

18 Claims, 12 Drawing Sheets

(56) References Cited

U.S. PATENT DOCUMENTS

| | | | |
|---|---|---|---|
| 2,267,254 A | 12/1941 | Reilley | 180/21 |
| 3,428,015 A | 2/1969 | Cloud | 441/78 |
| 3,905,323 A | 9/1975 | Kacere | 114/39.23 |
| 4,386,787 A | 6/1983 | Maplethorpe et al. | 280/206 |
| 4,438,588 A | 3/1984 | Martin | 46/228 |
| 4,729,446 A | 3/1988 | Sefton | 180/21 |
| 4,927,401 A * | 5/1990 | Sonesson | A63H 33/005 280/206 |
| 6,227,933 B1 * | 5/2001 | Michaud | A63H 33/005 446/458 |
| 6,298,934 B1 | 10/2001 | Shteingold | 180/10 |
| 7,767,335 B2 | 8/2010 | Sharrow et al. | 429/156 |
| 7,963,350 B1 | 6/2011 | Thielman et al. | 180/7.1 |
| 8,322,471 B2 | 12/2012 | Schroll | 180/54.1 |
| 8,672,062 B2 | 3/2014 | Schroll | 180/8.1 |
| 8,768,548 B2 | 7/2014 | Thielman | 701/22 |

OTHER PUBLICATIONS

G. C. Schroll: "Dynamic Model of a Spherical Robot from First Principles", Thesis, Colorado State University (2010). http://dspace.library.colostate.edu/webclient/DeliveryManager/digitool_items/csu01_storage/2011/02/21/file_1/88686.

* cited by examiner

SPHERICAL TRACTOR OPERATING MOBILE PLATFORM

CROSS REFERENCE TO RELATED APPLICATION

The invention is a Continuation-in-Part of, claims priority to and incorporates by reference in its entirety U.S. patent application Ser. No. 14/263,529 filed Apr. 28, 2014 assigned Navy Case 103220, subsequently issued as U.S. Pat. No. 9,152,148. That parent application is a Continuation of U.S. Pat. No. 8,768,548, which is a Continuation-in-Part of and claims priority to U.S. Pat. No. 7,963,350 also incorporated by reference in its entirety.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to locomotion of spherical devices. In particular, the invention relates to spherical mobile platforms using tractor operation for propulsion and steering.

Propelling and steering a ball from inside constitutes a technical challenge that has motivated attention, and led to various innovations. One such effort involved conceptualizing spherical platforms designed for ferrying persons into hostile close-quarter areas for reconnaissance, e.g., U.S. Pat. No. 7,963,350 called a spherical armored mobile platform (SAMP), and for remote-control infrared sensing, e.g., U.S. Pat. No. 8,768,548 called a spherical infrared robotic vehicle (SIRV). These solutions involve lower and upper internal carriages equipped with wheels that rotate along an outer shell of the platform to induce vehicle translation along an external surface. Other autonomous robots with spherical shells have been developed, including self-propelled machines designed for locomotion along horizontal and uneven surfaces.

Also, currently deployed robotic reconnaissance vehicles are designed to patrol areas in which hostile response to military presence may be suspected but difficult to identify by location, such as sniper attacks from high windows in an urban setting. Such vehicles may be constrained by considerations of speed (e.g., external tracks), obstacle traversal (e.g., wheels) and/or maneuverability. In addition, the use of visual cameras may be of marginal utility for night-time or other conditions of low-visibility surveillance.

SUMMARY

Conventional armored vehicles and autonomous robots yield disadvantages addressed by various exemplary embodiments of the present invention. In particular, a spherical tractor operating mobile platform (STOMP) is provided herein for internally propelling and steering a ball. Exemplary embodiments include a spherical navigatable ordnance resistance tractor (SNORT) for personnel transport into a militarily hostile environment. A civilian version is referred to as a geodesic recreational sphere (GReaSe). Alternative exemplary embodiments provide a self-propelled remote control spherical internal tractor excursion robot (SITER) for local reconnaissance.

Various exemplary embodiments provide a spherical tractor operating mobile platform (STOMP) to internally propel and steer along an external surface. The STOMP includes a spherical shell, an internal chassis and port and starboard tracks operating within the shell, as well as an overhead wheel assembly to maintain compression of the tracks against the shell. In various exemplary embodiments, drive wheels that engage the tank tracks are driven by a motor and structurally supported by the chassis. The treads of the tracks engage the shell's inner surface and turn in response to the motor. The STOMP includes a steering mechanism that selects which of the port and starboard drive wheels to be rotated for steering the shell.

In one preferred embodiment a spherical navigatable ordnance resistance tractor (SNORT) is provided for at least one operator to enable protected entry and egress from a militarily hostile environment. The SNORT includes a spherical shell and an armored cockpit (as the chassis) contained within the shell. The SNORT further includes and port and starboard tank tracks operating within the shell and connecting to the cockpit. The spherical shell has inner and outer surfaces and features a plurality of cavities that extend therethrough. These cavities can be arranged to conform to a geodesic pattern. The cockpit houses a seat for receiving an operator, a guidance controller, a display console, and an electric motor connected to a power supply.

The cavities are disposed within three-sided boundaries of a geodesic dome. The SNORT can further include a plurality of optical sensors disposed on the cockpit, and a signal integrator to present temporally concatenated visual signals into a mosaic at the display console.

The SNORT includes a door on the cockpit that slides between open and closed positions, and a hatch on the sphere that hinges between second open and closed positions. In optional exemplary embodiments (e.g., for military reconnaissance), the SNORT can also include a projectile-firing gun mounted to the cockpit, and a trigger control to enable actuation of the gun in response to the projectile exiting the sphere at an instance that coincides with a cavity of the plurality of cavities. In other optional exemplary embodiments, the shell and cockpit can be non-armored and/or composed of tubular construction in a geodesic frame to improve unaided visibility. This civilian-intended vehicle can be called a geodesic recreational sphere (GReaSe) and can be used for off-road travel and/or roller-derby contests, among other purposes.

Additionally, a self-propelled remote control spherical internal tractor excursion robot (SITER) is provided herein for local reconnaissance. The SITER includes a spherical shell, a carriage of chassis within the shell, and a tractor drive disposed between the chassis and the shell. For reconnaissance, the SITER further includes a remote control transceiver to guide the tractor drive, and a set of sensors. An infrared camera represents an exemplary sensor type, which can be coupled with a shell composed of silicon, which is substantially transparent to infrared radiation. Alternatively, the sensors can include chemical detectors and/or audio amplifiers for traversing through pipes to identify a leak. As an alternative to remote control, the SITER can be equipped with obstacle sensors, such as accelerometers and an autonomous navigation system, such as for pipe locomotion, together with a recording apparatus and inertial guidance system to recall locations identified with diagnostic events.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC), a field-programmable gate array (FPGA), digital signal processor (DSP) or other related component.

Various exemplary embodiments of the spherical tractor operating mobile platform (STOMP) are described with reference to the drawings. The first particular set of embodiments is the spherical navigatable ordnance resistance tractor (SNORT), which provides concentric shells, the inner to provide protective armor for an occupant, and the outer to enable self-propelled locomotion along a terrain. The SNORT provides room for a single occupant as driver, navigator, and weapons operator from inside the inner shell or cockpit. A modified cockpit would provide room for a second occupant sitting abreast, similar to that shown in U.S. Pat. No. 7,963,350 (mistakenly described as tandem arrangement).

The SNORT includes an outer spherical shell (or roller ball) that includes through-cavities and an inner shell (or cockpit) that provides armor protection. The roller ball forms a hollow sphere. The cockpit forms a hollow oblate spheroid. Between the shells are upper and lower wheel chasses. The cockpit has an aft hatch that slides forward. The roller ball has at least two hatches that open outward. The cockpit includes a reclined seat, an instrument display and a control unit. The SNORT can incorporate firing weapons, such as the M2 Browning Machine Gun (BMG) that fires .50 caliber rounds, and the M240 (or earlier M60) machine gun that fires 7.62×51 mm NATO cartridges.

Figure 1:
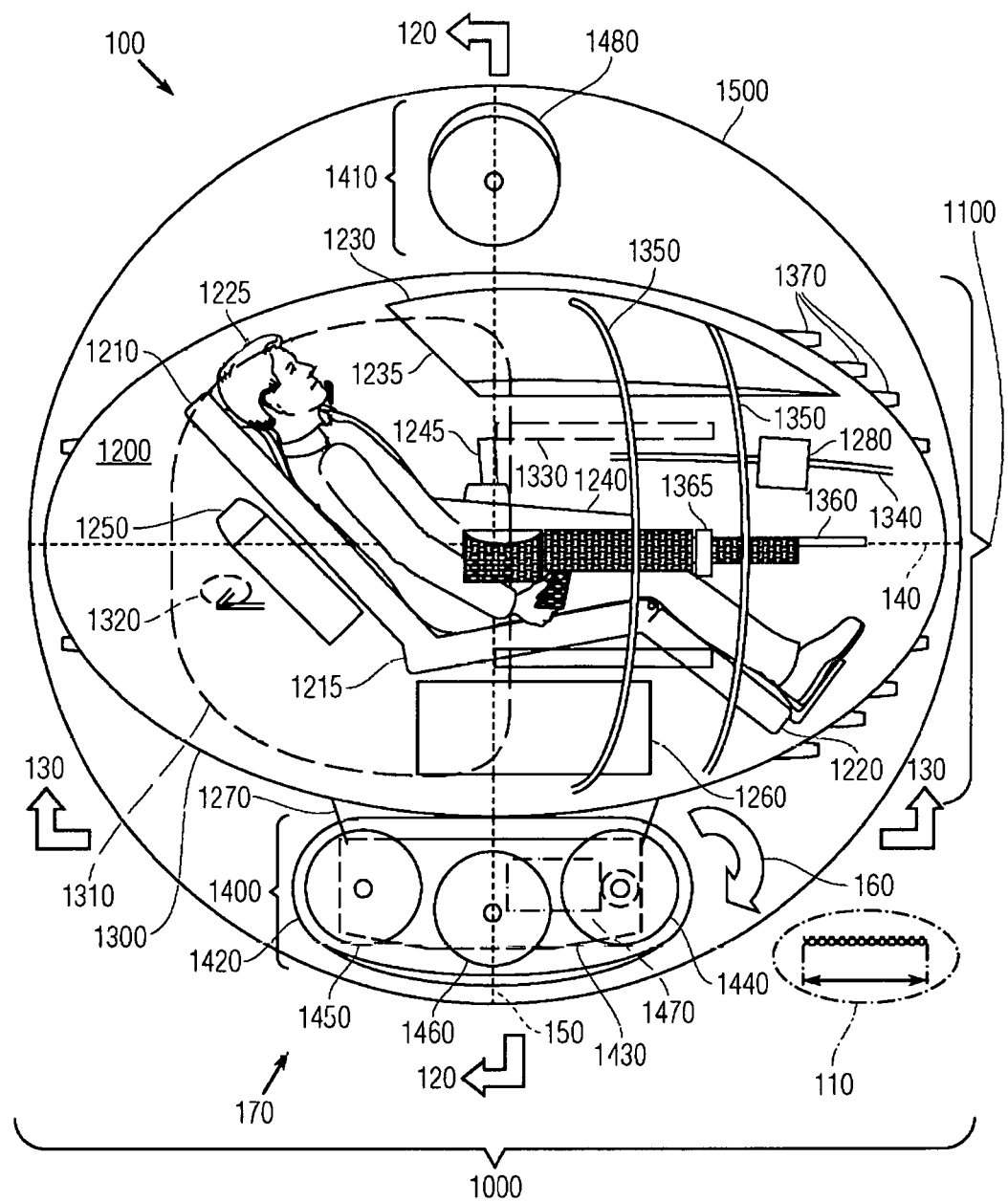
FIG. 1 is a cross-section starboard elevation view of an armored platform.
Figure 2:
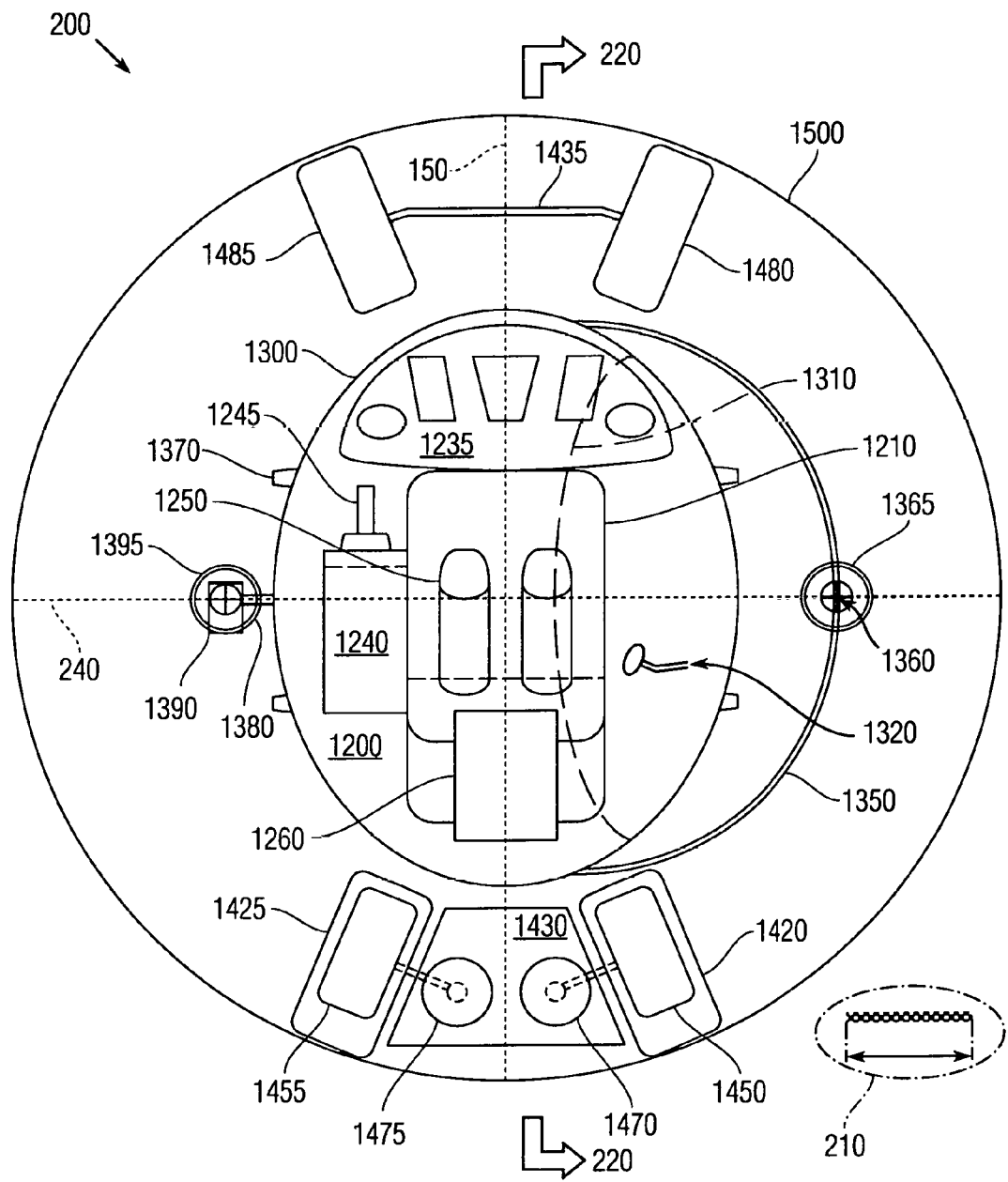
FIG. 2 is a cross-section aft elevation view of the armored platform.
Figure 3:
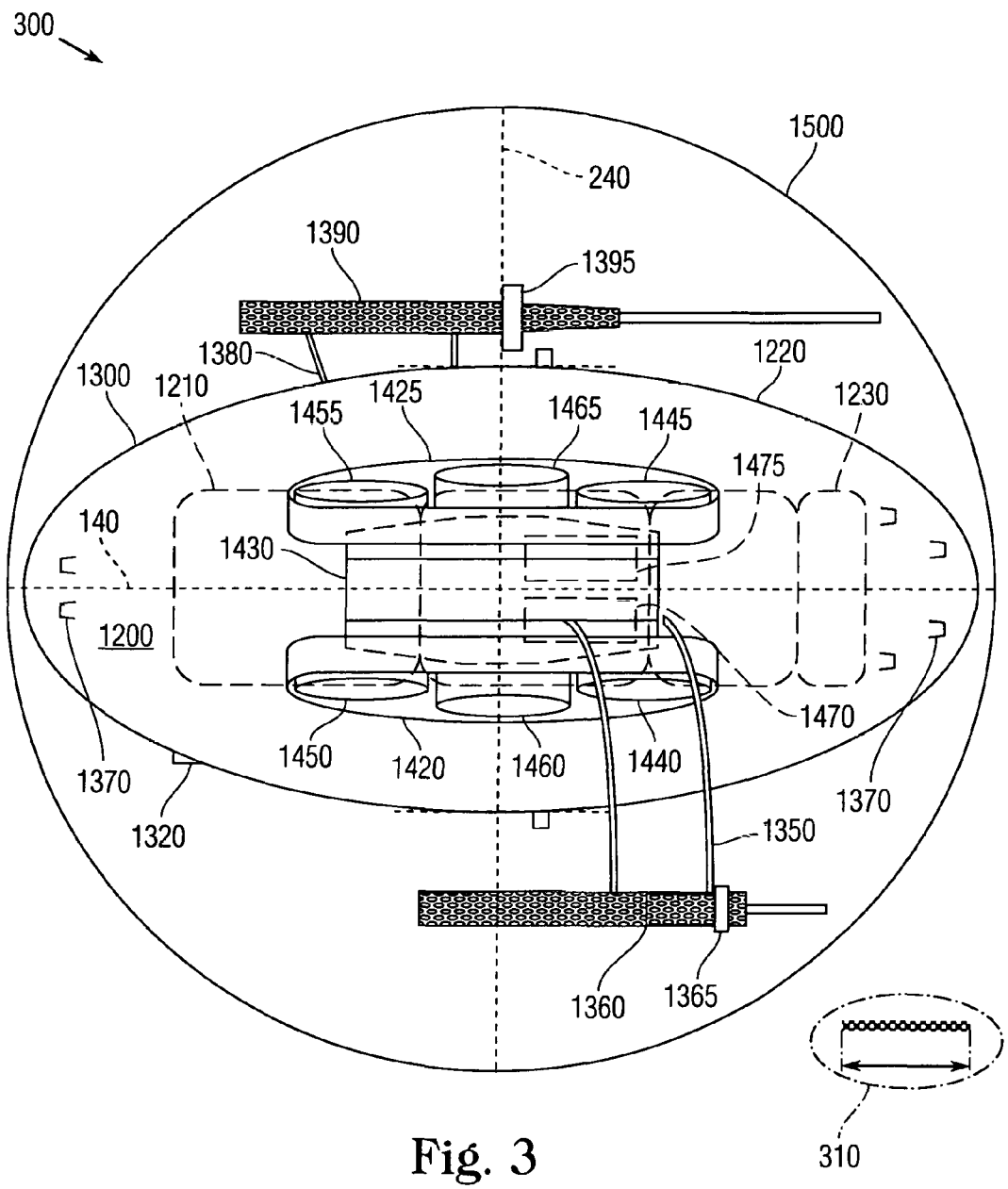
FIG. 3 is a cross-section plan view of the armored platform.

FIGS. 1 through 3 show various views of the SNORT in approximate scale. FIG. 1 presents a starboard cross-section elevation view 100 with scale-rule 110, aft section 120, upper section 130, axial centerline 140, vertical centerline 150, rotational arrow 160 and first view portion 170 (of a torque transfer system). The scale-rule 110 denotes approximately one foot in length. FIG. 2 presents an aft cross-section elevation view 200 with scale-rule 210, respective starboard and port sections 220 and 230, lateral centerline 240 and second view portion 250. FIG. 3 presents a plan cross-section view 300 with scale-rule 310, aft section 230 and third view portion 330.

Figure 4A:
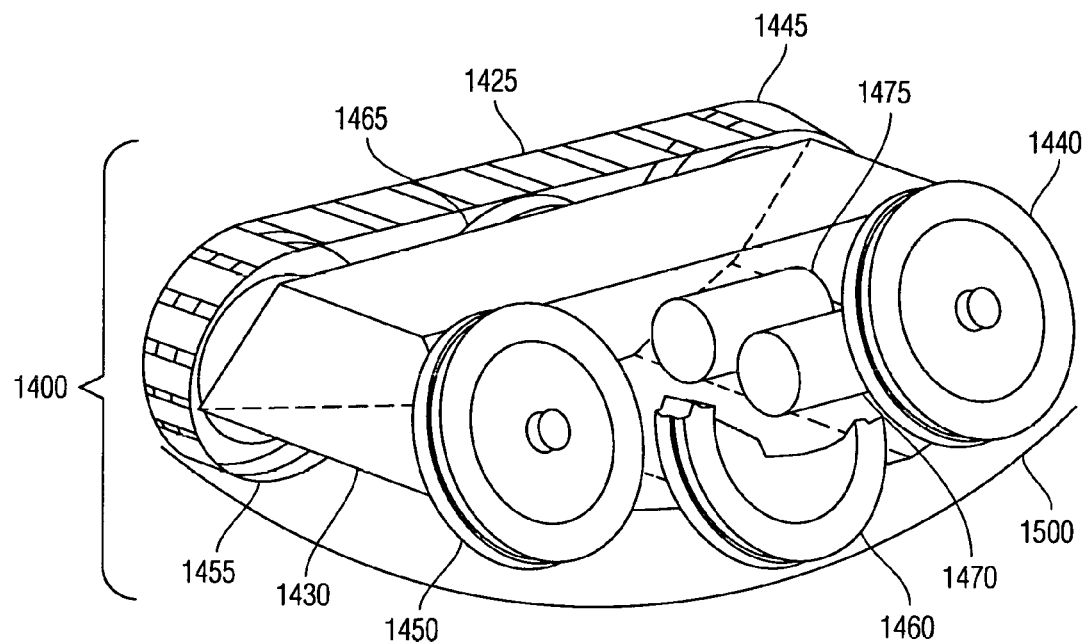
FIGS. 4A and 4B are isometric views of a tractor drive system.
Figure 4B:
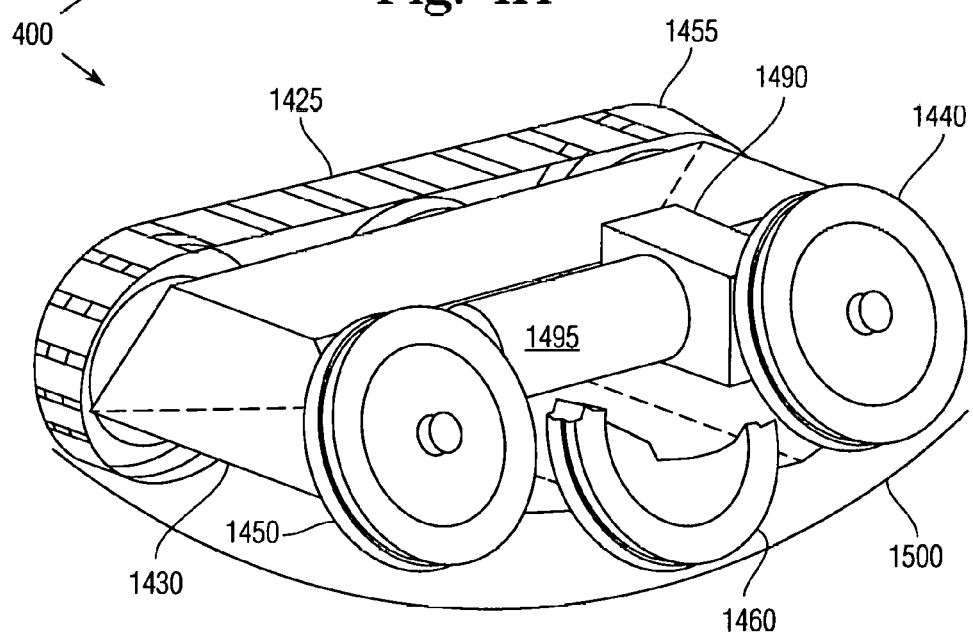
Figure 5A:
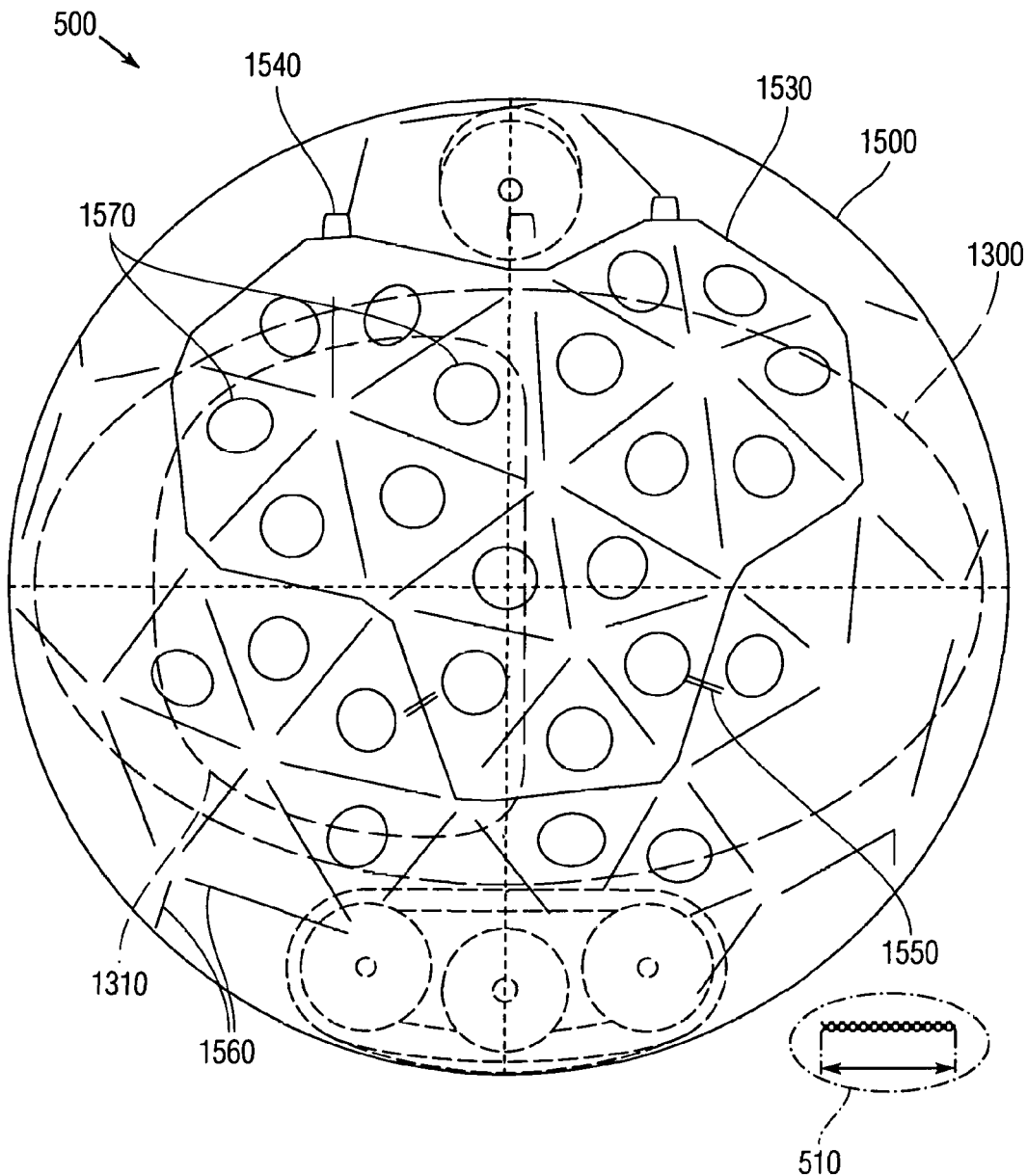
FIGS. 5A and 5B are starboard elevation views of the shell exterior.

FIGS. 4A and 4B show isometric views 400 of a tractor drive system with alternate steering control embodiments for the STOMP. FIG. 5A presents a starboard exterior elevation view 500 of the SNORT in a closed configuration with scale 510, and FIG. 5B similarly presents a supplemental starboard exterior elevation view 520 of the SNORT in an open configuration.

Figure 6A:
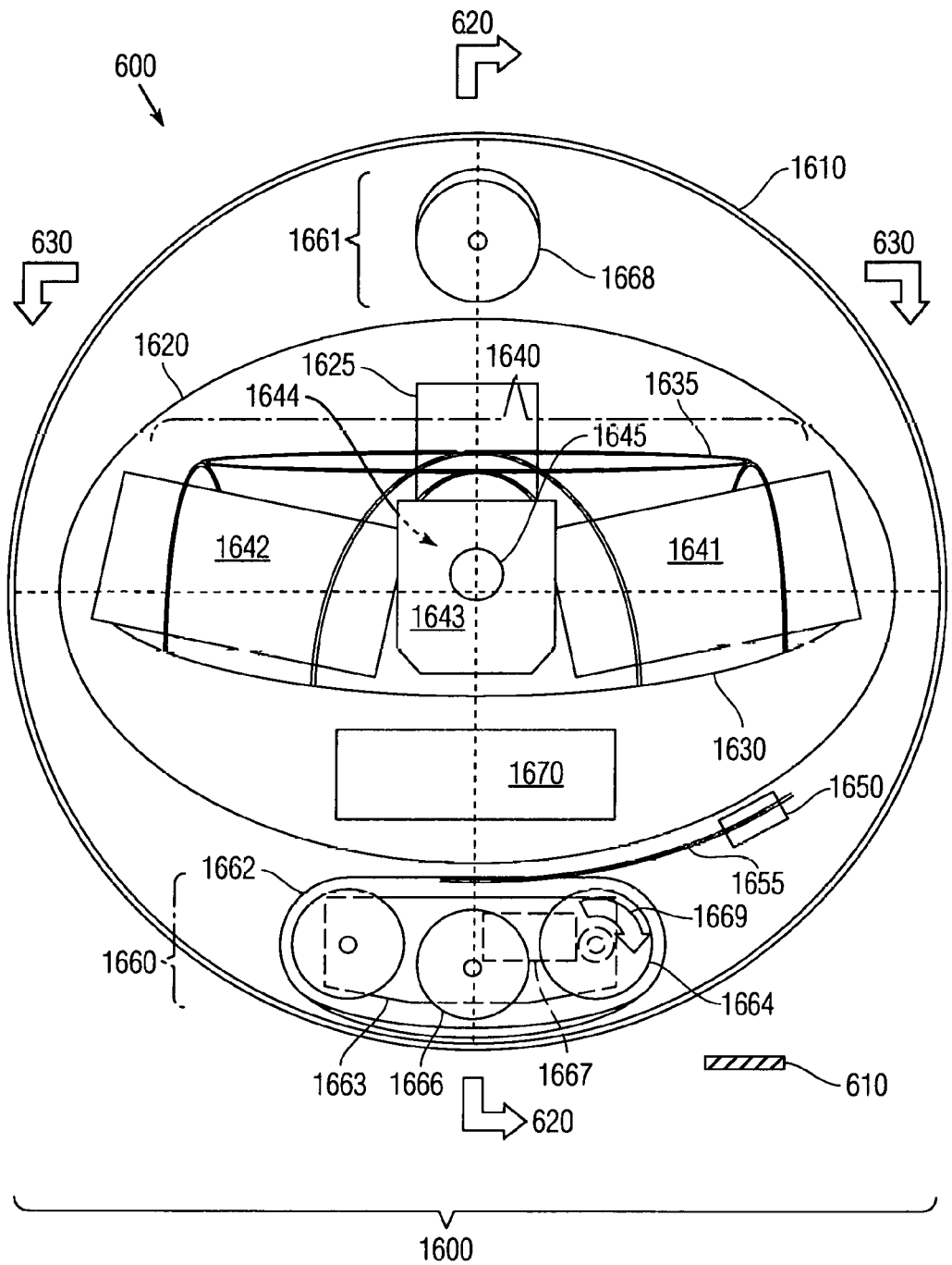
FIG. 6A is a starboard elevation view of a spherical remote control vehicle.
Figure 6B:
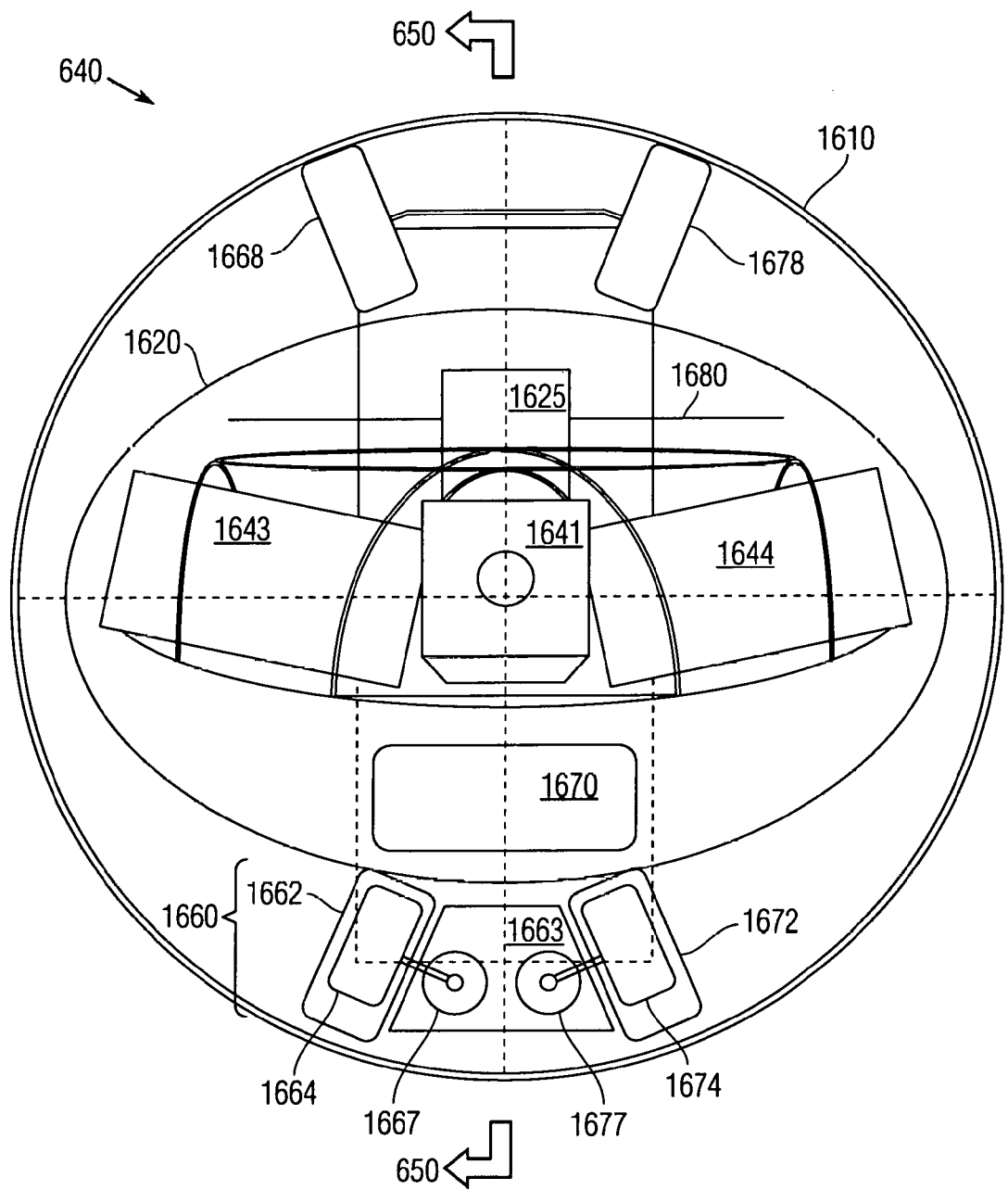
FIG. 6B is a fore elevation view of the remote control vehicle.
Figure 6C:
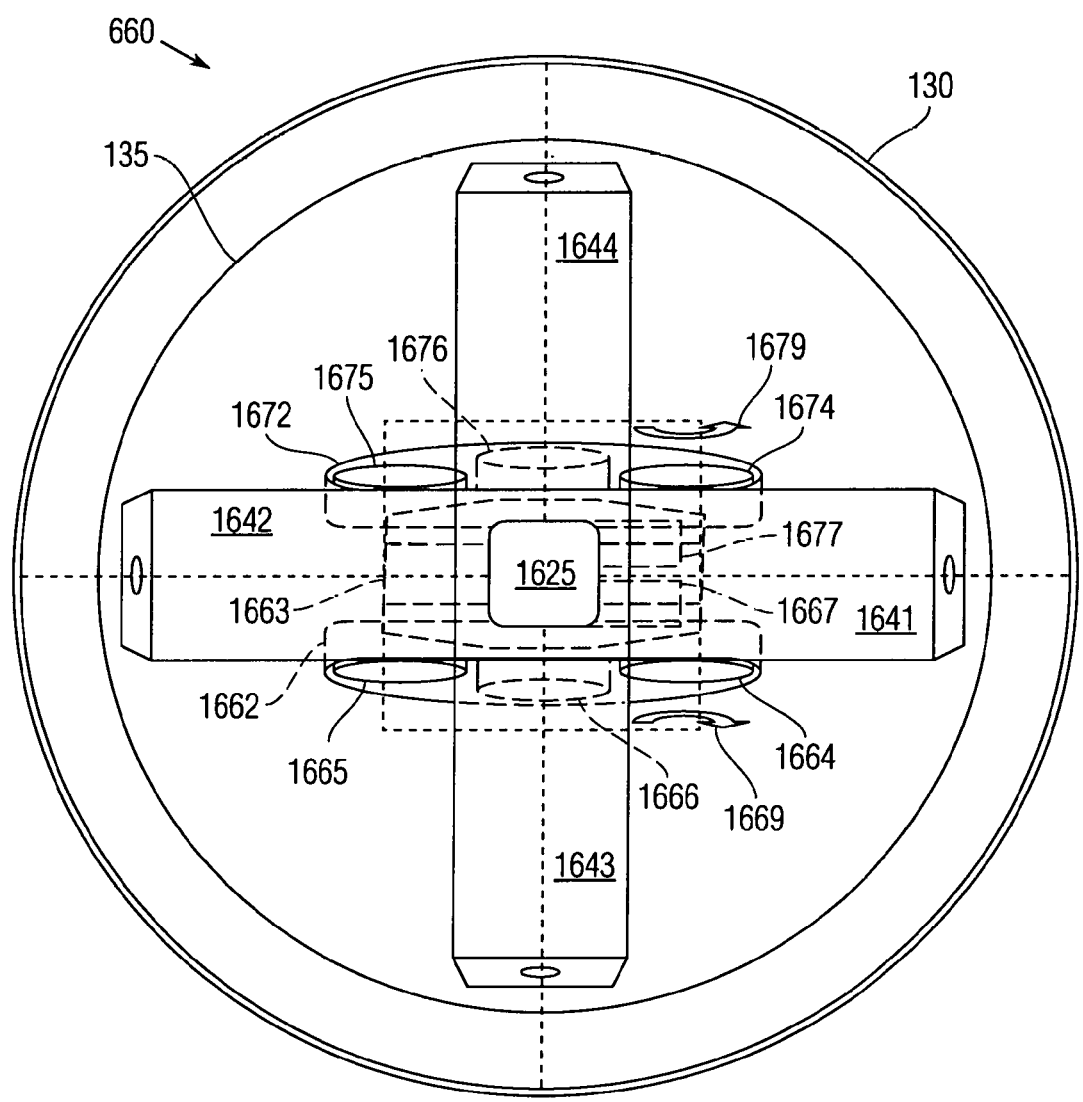
FIG. 6C is a plan view of the remote control vehicle.

FIG. 6A presents a starboard elevation view 600 of a self-propelled remote control spherical internal tractor excursion robot (SITER) with scale-rule 610, fore section 620 and lower section 630. The scale-rule 620 denotes approximately one inch (~2.5 cm) in length, such that the outer diameter of the SITER for the depicted configuration corresponds to about one foot (0.30 m). FIG. 6B presents a forward elevation view 640 of the SITER with starboard section 650. FIG. 6C presents a plan view 660 viewed from above with fore section 620 and starboard section 650.

Figure 7A:
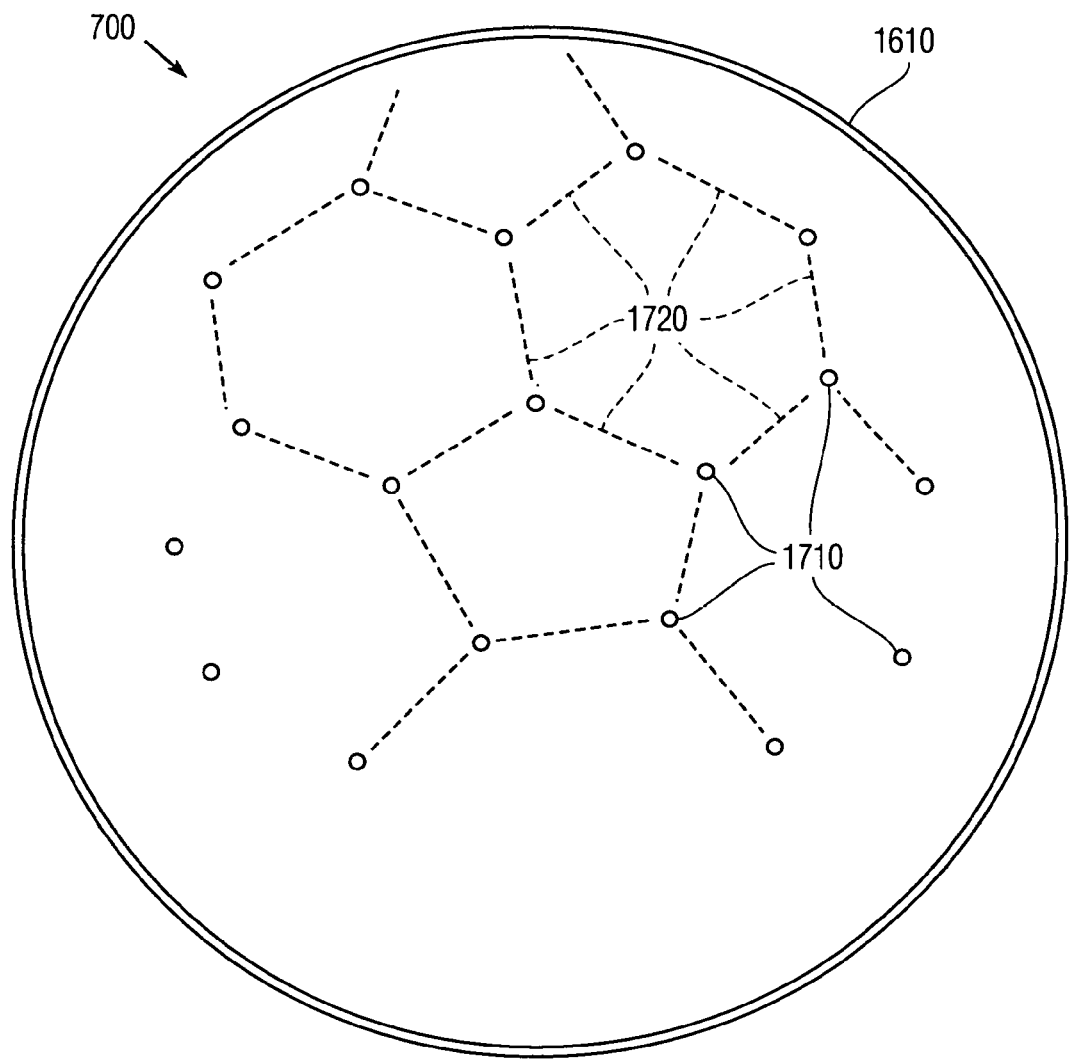
FIGS. 7A and 7B are elevation views of the remote control vehicle shell.
Figure 7B:
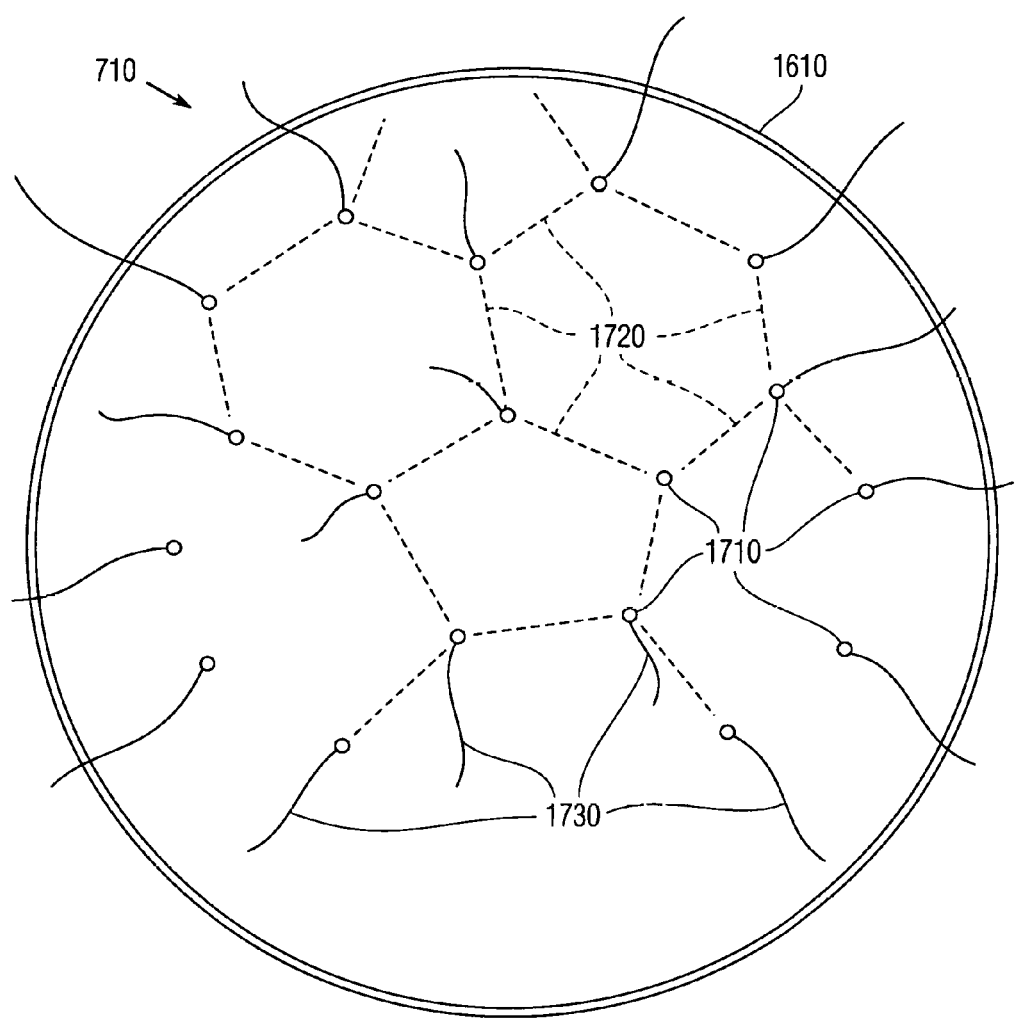
Figure 8A:
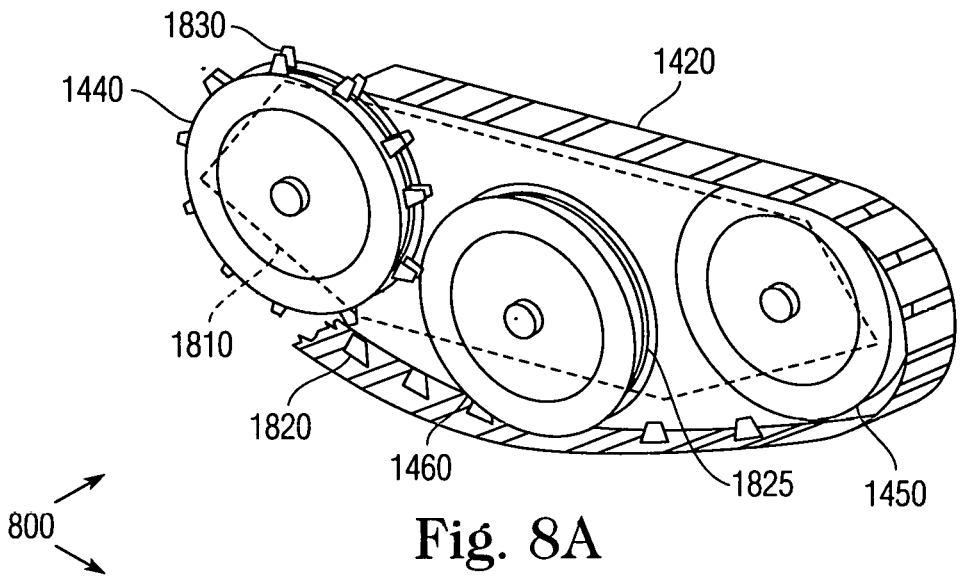
FIGS. 8A and 8B are isometric views of wheels and tracks of the tractor drive system.
Figure 8B:
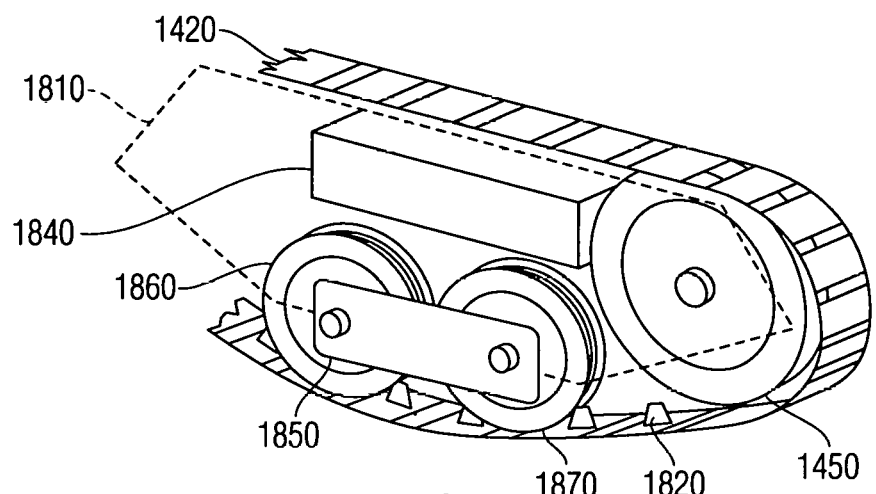
Figure 8C:
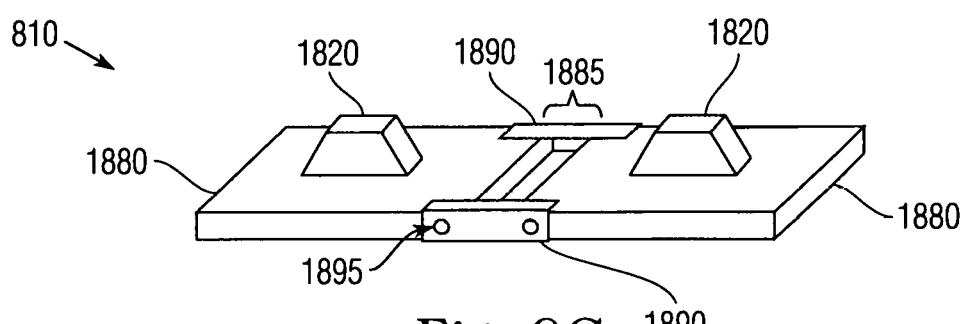
FIG. 8C is an isometric detail view of track linkage mechanisms.

FIG. 7A presents a starboard exterior elevation view 700 of the SITER for a rigid configuration for ground travel, and FIG. 7B similarly presents a supplemental starboard exterior elevation view 710 for a flexible configuration for water surface travel. FIGS. 8A and 8B present isometric views 800 of tractor treads and wheels for exemplary track tension embodiments of the STOMP. FIG. 8C presents an isometric detail view 810 of track linkages.

In FIG. 1, the starboard view 100 shows a SNORT 1000 containing a cockpit 1100 that defines an interior 1200. A reclined seat or couch is disposed within the cockpit interior 1200 along the longitudinal direction parallel to the axial centerline 140. The couch includes a back brace 1210, a seat 1215 and a leg rest 1220 with which to support an operator 1225. The interior 1200 further includes a display console 1230 that provides an instrument monitor 1235 (in FIG. 2), a guidance unit 1240 with a joystick 1245, oxygen supply breathing tanks 1250, and an electrical package 1260 that contains batteries and power controller. The joystick 1245 intended for steering can be optionally replaced with a yoke handle, foot pedals or alternate control input devices. The cockpit 1100 also provides attachment mounts 1270 for a locomotion system, further described below.

The console 1230 provides storage space is disposed forward of the operator 1225 and provides storage volume for electronics. The instrument monitor 1235 can provide visual information for navigation and weapons targeting, as well as indicators for hatch orientation, battery status, vehicle speed, navigational position, motor torque, etc. The console 1240 provides the control system from which the operator 1225 provides instructions through the joystick 1245 for travel and weapons discharge. The breathing tanks 1250 (e.g., scuba) support an optional breathing apparatus for the operator 1225 for circumstances in which the interior 1200 is sealed from outside to protect against chemical-biological warfare (CBW) agents. Alternatively, ventilation ports can be incorporated through the cockpit 1100.

The electrical package 1260 can include a direct current (DC) power supply, such as a battery and a controller to provide proper voltage to various internal systems of the SNORT 1000. Electrical storage can be obtained, for example, from linked 2200-series Nickel-Cadmium (NiCad) cells provided by SR Batteries Inc. at Box 287, Bellport N.Y. 11713. Each cell has a 0.9 inch (23 mm) diameter and 1.69 inch (43 mm) length weighing 2.1 oz (60 g) producing 1.25 volts at 2.2 amp-hours and with 5Ω impedance. These NiCad cells can be concatenated in series as provided in U.S. Pat. No. 7,767,335 in assembly units of 350 volts or 700 volts. Power storage may be augmented transferring braking force to an optional flywheel to recharge the battery.

The 350-volt unit has dimensions of 15.3 inches×13.3 inches×8 inches (389 mm×338 mm×203 mm) and weighs 65 lb (30 kg) composed of eight trays linked in series, with each tray containing thirty-five cells. This can produce electrical energy of 350 (volts)×2.2 (amp-hrs)=770 Watt-hrs=2.77 megaJoules (MJ) or 1.03 horsepower-hour (hp-hr). The 700-volt assembly may combine two 350-volt units with the third dimension being doubled. Assuming peak current of ~30 amps from each 350-volt unit, available power is estimated at ~21 kW (or ~28 hp). Alternate battery configurations can also be contemplated for power supply purposes. For example, The Model S from Tesla Motors uses batteries with 75 kWh (270 MJ) or 85 kWh (306 MJ) energy capacity, compared to the Chevrolet® Volt at 12 kWh.

The SNORT's center of gravity can be adjusted by translatable trim ballast 1280 that controllably slides along at least one interior rail 1285. (Alternatively, such ballast can be contained within the console 1230.) Preferably, the trim ballast 1280 either travels parallel to the axial centerline 140 or comprises a complimentary and independently controllable pair of masses and slider mechanisms disposed along the port and starboard sides of the cockpit 1100. The trim ballast 1280 can be moved and set manually for park positioning or automatically by a drive mechanism to facilitate acceleration of the SNORT 1000. By shifting the trim ballast 1280 forward, power demand from the electrical package 1260 may be reduced, enabling the SNORT 1000 to move forward and/or to clear a modest ground obstacle.

The cockpit 1100 is contained by an oblate spheroid 1300 that includes an access door 1310 equipped with a handle 1320 that extends both into the interior 1200 and external to the spheroid 1300. As depicted herein, the door 1310 is disposed towards the aft starboard side and opens by sliding forward along racers 1330. Similarly, the trim ballast 1280 may traverse along external rails 1340, such as along the top of the spheroid 1300, either in substitution of or in addition to the interior rails 1285. Artisans of ordinary skill will recognize that alternate arrangements and bilateral geometries that fit into the outer shell may be contemplated without departing from the invention's scope.

Bars 1350 extend from beyond continuous travelling positions of the door 1310 to support a medium machine gun 1360 (e.g., M60) that fires 7.62 mm rounds. The gun 1360 includes an annular optical view-sight 1365 for sighting from within the ball. Optical sensors 1370 may be disposed along the exterior of the spheroid 1300 for viewing external environmental conditions from within the ball. The sensors 1370 can be miniature digital video cameras. Such a camera can detect photons with a charge-coupled device (CCD) array, for example. FIG. 2 shows brackets 1380 that mount an M2 BMG 1390 with an annular optical view-sight 1395.

As presented for the single-person mobile platform SNORT 1000, the cockpit 1100 has approximate exterior dimensions of 84 inches (2.13 m) in length, 38 inches (0.97 m) in width and 56 inches (1.42 m) in height, as observable from the scale-rules 110, 210, 310. For a thickness of 1-inch (25 mm) and composed of stainless-steel (e.g., 304L with density of 0.29 lb/in$^3$ or 8.03 g/cm$^3$), the cockpit 1100 has an empty (or tare) mass of 2200 lb (1000 kg) based on construction volume of ~7600 in$^3$.

The electrical package 1260 may be about 150 lb (~70 kg) with batteries being about 130 lb (~60 kg). The M60 gun 1360 is about 42 inches (1.08 m) long and weighs about 23 lb or 11 kg). (By comparison, the M240 gun is about 49 inches or 1.24 m long and weighs about 28 lb or 13 kg.) The M2 BMG (gun) 1390 is 65 inches (1.65 m) long and weighs 84 lb (38 kg). Artisans of ordinary skill will recognize that alternate weapons can be selected for the mobile platform 1000 without departing from the scope of the invention. Additional equipment and auxiliary armor (e.g., under the cockpit 1100 for mine deflection) can also be installed to satisfy specific purposes.

The operator 1225, console 1230, guidance unit 1240, electrical package 1260, guns 1360 and 1390, ammunition and auxiliary equipment can be estimated as 1100 lb (~500 kg) yielding 3300 lb (1500 kg) for the gross cockpit mass. For neutral stability, the center of mass of the cockpit 1100 can be optimized as along the lateral centerline 250, below the axial centerline 140 and slightly forward of the vertical centerline 150 by disposition of the package 1270, ballast 1280, ammunition and auxiliary equipment. The trim ballast 1280 can provide trim adjustment of the mass center during operation. In alternate embodiments be disposed along the exterior spheroid 1300 of the cockpit 1100 to operate automatically responding to shifts in moment from recoil of the guns 1360 and/or 1390. Artisans of ordinary skill will recognize that these dimensions are merely exemplary and that further engineering may yield more optimal specifications. In addition, a SNORT designed for two or more operators can entail further design changes over the SAMP example described.

FIGS. 1 through 3 also show a continuous tractor drive system 1400 attached cockpit's spheroid 1300, as well as an overhead wheel system 1410, both mounted to the spheroid 1300 to engage in compression the outer spherical shell's interior. The tractor drive 1400 includes a starboard tread assembly 1420 and a port tread assembly 1425, both engaging the sphere's interior for traction. The tractor drive 1400 further includes a frame 1430 that attaches by the mounts 1270 to the spheroid 1300, while the wheel system 1410 includes a shaft 1435 with universal joints. Both attachments can optionally incorporate shock absorbers and springs to mitigate shock and vibration in the cockpit 1100. The illustrations depict the treads 1420 and 1425 splayed at about 15° from the vertical centerline 150, but this is exemplary only and other configurations can be contemplated (e.g., between about 10° to about 40°) without departing from the scope of the claims.

A starboard drive wheel 1440 engages and is contained within the starboard treads 1420, while a port drive wheel 1445 engages and is contained within the port treads 1425. Starboard and port rear idler wheels 1450 and 1455 are also engage and are contained within their respective starboard and port treads 1420 and 1425. Starboard and port tension wheels 1460 and 1465 are also contained within their respective treads 1420 and 1425. Artisans will recognize that additional tension wheels between each side's drive and idler wheels can be contemplated without departing from the scope of the invention. The frame 1430 contains starboard and port motors 1470 and 1475 powered by the electrical package 1260 to deliver torque to their respective drive wheels 1440 and 1445. The overhead wheel assembly 1410 includes starboard and port compression idler wheels 1480 and 1485 that connect to the universally jointed axle 1435, which is mounted to the spheroid 1300. Artisans will recognize that plural sets of compression idler wheels together with an optional overhead bogie housing can be contemplated without departing from the scope of the invention.

As shown in the exemplary drawings, the drive wheels 1440, 1445 and the idler wheels 1450, 1455 are each about 12 inches (305 mm) in diameter. The tension wheels 1460, 1465 and the compression wheels 1480, 1485 can be of similar or different size, depending on the design configuration. The tracks 1420 and 1425 each have links with a contact width of about 9 inches (229 mm). As shown, each track has a contact arc length of about three feet (915 mm), although this is only exemplary for purposes of illustration. Thus, total area in contact of both tracks with the inner sphere surface is about 648 square inches (100 cm$^2$). Width and/or length can be extended to improve and homogenize traction. Each track 1420 and 1425 supports about 2640 lb (1200 kg) distributed over 324 square inches, each set of treads 1420 and 1425 imposes a pressure of about 8.1 lb/in$^2$ (psi, or 56 kPa) on the outer sphere.

As shown in FIGS. 1 through 3, the internal cockpit 1100 and the tractor drive 1400 are contained within an outer spherical shell 1500 that constitutes the roller ball. Frictional contact between the treads 1420, 1425 and the sphere 1500 causes the latter to rotate in the same direction as the former. As shown in FIG. 2, the tractor drive 1400 and overhead wheel assembly 1410 are disposed in compression against the sphere's interior (conjunctively both upper and lower) perpendicular to the local surface tangent, to maintain the cockpit 1100 upright without tumbling. The interior surface of the shell 1500 can be coated with an anti-slip material in conformance with MIL-PRF-24667B for aircraft carrier decks in order to facilitate traction with the tractor drive 1400. Rotating the drive wheels 1440 and 1445 induce rolling of the respective tracks 1420 and 1425, which frictionally engage the interior surface of the shell 1500. This squirrel-cage motion enables the shell 1500 to revolve and thereby roll as directed by the drive wheels 1440 and 1445.

FIG. 4A shows an isometric view 400 of an exemplary embodiment of the tractor drive system 1400. In this illustration, the starboard track 1420 is omitted for clarity and the starboard tension wheel 1460 is depicted in cutaway. The port track 1425 is disposed on a section of the shell 1500. This illustration shows motors 1470 and 1475 disposed abreast, and these can, for example, be similar to those used for electric automobiles that run at 96 volts or 192 volts DC. Alternate embodiments of the tractor drive system 1400 include a distributed differential gearbox 1490 and a single motor 1495, which can also be the DC type, or alternatively can be an alternating current (AC) motor, such as a three-phase motor operating at 240 volts. The motors 1470, 1475 or else the motor 1495 may optionally be connected to radiation fins to improve heat dissipation.

For the embodiment in FIG. 4A, the starboard motor 1470 delivers torque to the starboard drive wheel 1440, and the port motor 1475 delivers torque to the port drive wheel 1445. Both motors 1470 and 1475 are controlled by the operator 1225 through the joystick 1245. By commanding power from the electrical package 1260 only to the starboard motor 1470, the starboard drive wheel 1440 rotates to engage the starboard track 1420 causing the shell 1500 to turn to port. Similarly, by commanding power to only the port motor 1475, the port drive wheel 1445 rotates, causing the shell 1500 to turn to starboard. Commanding both motors 1470 and 1475 to rotate both drive wheels 1440 and 1445, the shell 1500 moves forward, with the drive wheels 1440 and 1445 rotating clockwise (envisioned from starboard) in view 100. Reversing the motors 1470 and 1475 enables the shell 1500 to move rearward. Torque can be transmitted through bevel gear linkages, as is well understood, unless the motors 1470 and 1475 are designed to be in axial alignment with the respective drive wheels 1440 and 1445, as provided by the Segway scooter.

For the embodiment in FIG. 4B, the motor 1495 provides torque through the differential gearbox 1490, which enables selection of either or both drive wheels 1440 and 1445 to starboard motor 1470. Delivering torque to both wheels 1440 and 1445 causes the shell 1500 to move forward. Delivering torque to the starboard wheel 1440 alone causes the shell 1500 to turn to port, and delivering torque to the port wheel 1445 alone causes the shell to turn to starboard. The shown arrangement of drive, idler and tension wheels are exemplary only, assuming a front-wheel drive configuration. Alternatively, the order can be inverted so that the motors can provide torque to the rear wheel.

As shown in FIG. 5A, the outer spherical shell 1500 includes at least one hatch 1530 pivotably attached thereto by an external pair of hinges 1540. The hatch 1530 can be secured by internal latches 1550 in the closed position as shown. The shell 1500 forms a geometry of boundary lines 1560 (that need not be visibly denoted) to form a triangular (actually three-side curvilinear) geodesic dome configuration based on a truncated isosahedron.

Figure 5B:
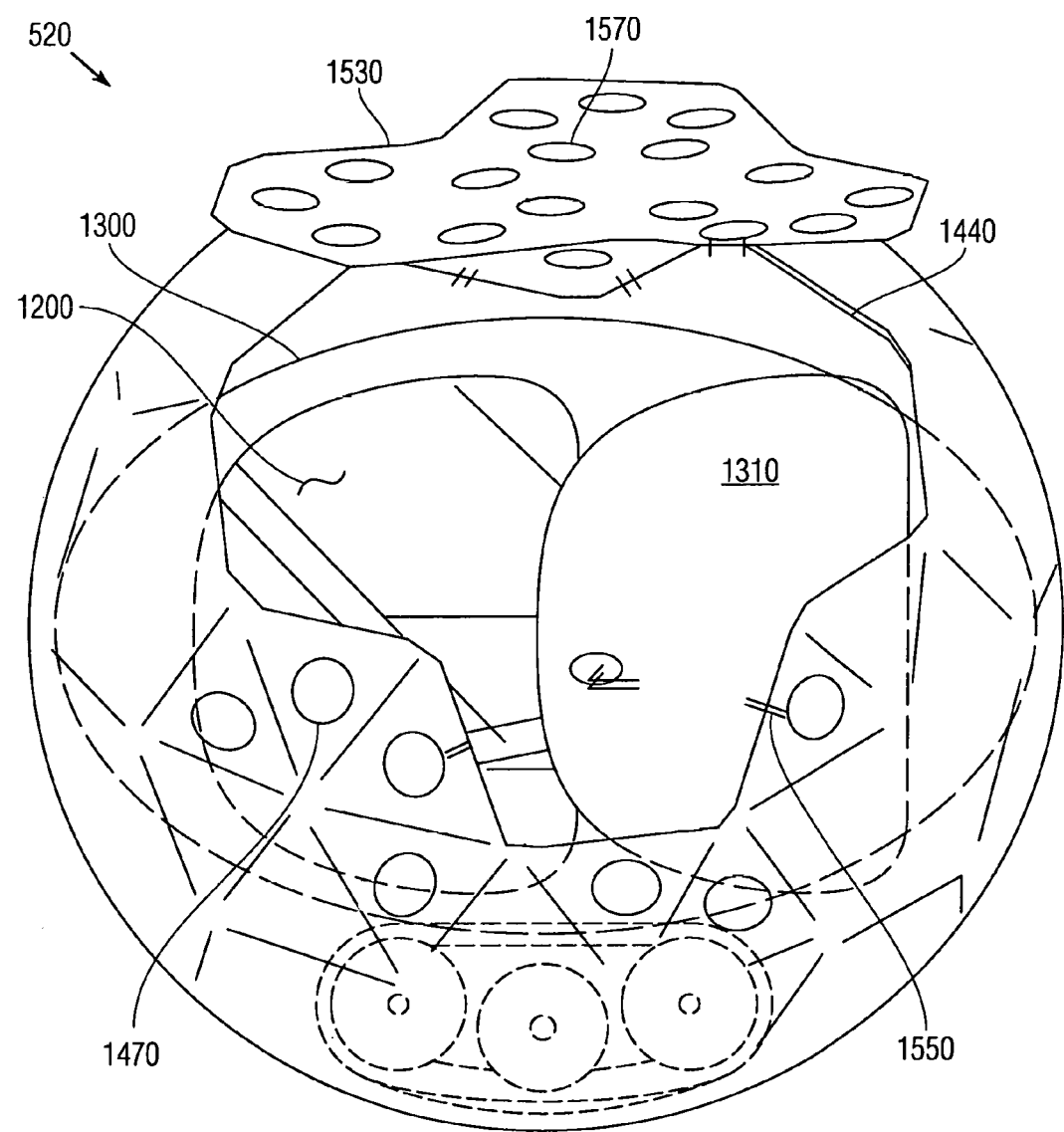

FIG. 5B distinguishes the lines 1560 and double-lines 1565 that characterize the geodesic dome geometry. The triangles formed by the lines 1560 and 1565 can incorporate cavities or windows 1570, which may be round for example, and denote hexagonal patterns 1580. The double-lines 1565 denote pentagonal patterns 1590 that connect the hexagonal patterns 1580.

FIG. 5B depicts the shell 1500 with the hatch 1530 disposed open, and the door 1310 slid forward exposing portions of the cockpit interior 1200. The windows 1570 provide viewports through which the optical sensors 1370 and the view-sights 1365 and 1395 can receive visual information from beyond the sphere 1500. The geodesic dome configuration features twelve pentagons 1590 and fifteen hexagons 1580, yielding one-hundred-fifty windows 1570 within the boundaries denoted by lines 1560.

The hatch 1530 can be formed based on a pair of hexagonal patterns 1580 that joins the hinges 1540 and a pentagonal pattern 1590 that engages the latches 1550, which can be recessed to reduce interference from the tractor drive 1400. Such a configuration provides opportunity for three such hatches 1530 distributed around the sphere 1500, although alternate configurations can be employed to enable more or fewer such hatches 1530 for entry and egress to the cockpit interior 1200 through the door 1310. Knobs can be disposed at the intersection of the lines 1560, as indicated by positions of the hinges 1540 embedded within, to improve traction along uneven terrain.

For assembly, the shell 1500 may be constructed from hemispherical sections welded together subsequent to the cockpit 1100 and tractor drive 1400 being installed therein. Alternatively, the hatch 1530 may be replaced with or augmented by latches for connecting and detaching the hemispherical sections. The shell 1500 can be estimated as about 44 inches (1.12 m) in radius, or 88 inches or 7⅓ feet (2.24 m) in diameter, with an exemplary thickness of about ⅜ inch (10 mm). The shell 1500 has an outer area of about 169 ft$^2$ (15.7 m$^2$). For windows 1570 exposing about one-third (⅓) of this area, each window corresponds to a circle having a diameter 8.3 inches (210.7 mm). Techniques for visual display by digital image integration and projectile synchronization through the windows 1570 as they pass downward while moving forward are provided in U.S. Pat. No. 7,963,350, incorporated herein by reference.

Assuming construction of stainless-steel, with one-third of the area open, the sphere 1500 has an estimated mass of 1320 lb (600 kg). The chassis for the steering, propulsion, struts, and wheels, can be estimated as about 880 lb (400 kg). Mass of the SNORT 1000 can thus be estimated as cockpit ~3300 lb and spherical shell ~1320 lb, together with locomotion, power and ballast at about three tons. The respective radii of the wheels 1400 and the sphere 1500 are 6 inches (152 mm) and 44 inches (1118 mm). (Their corresponding circumferences are 12π=38 inches and 88π=276 inches.) Thus, the rotation turning ratio between drive wheels 1440, 1445 and the sphere 1500 is 7.3:1 based on the reciprocal of their respective radii (assuming adequate friction to avoid slip). To drive the SNORT 1000 at 30 miles-per-hour that corresponds to 528 inches-per-second (13.2 m/sec), the sphere 1500 rolls at 115 revolutions-per-minute (rpm). Consequently, the drive wheels spin at 115 rpm×7.3=842 rpm. For a 60-hp 240-volt AC motor 1260 that operates at 1725 rpm, a 2.0:1 reduction gear may be employed to reduce the angular speed.

The mass of the cockpit 1100 with tractor drive 1400 of about 4000 lb moved along a wheel radius of 6 inches yields 2000 ft-lb. Torque T (ft-lb) is calculated for 60-hp 240-volt motors 1470 and 1475 operating at 1725 rpm by the relation T×ω÷P=c, in which ω is spin (rpm), P is power (in hp) and c is constant 5252, as T=5252×60÷1725=183 ft-lb, which is about fifty-percent greater than that of an automobile on typical road grade inclines. A civilian version of the SNORT 1000 can be envisioned as the geodesic recreational sphere (GReaSe). The spheroid 1300 and shell 1500 can be replaced by respective tubular cage constructions for improved unaided visibility, while maintaining the tractor drive system 1400 and electrical package 1260 for locomotion and steering control. The structural arrangement of the shell 1500 can incorporate a geodesic geometry for substantially uniform structural load traction surface. Tube surfaces for the shell cage may be roughened or coated with an anti-slip material to facilitate traction by the track drive.

Various exemplary embodiments of the spherical internal tractor excursion robot (SITER) are described with reference to the drawings. The SITER provides a chassis for mounting propulsion, power and sensor devices, and a spherical shell to enable self-propelled locomotion along a terrain. Exemplary embodiments provide plurality of infrared cameras aligned to view several directions represents a preferred embodiment of the SITER together with a remote control receiver.

FIG. 6A presents a starboard elevation view 600 of a SITER 1600 with the scale-rule 610, aft section 620 and upper section 630. The scale-rule 620 denotes approximately one inch (~2.5 cm in length, such that the outer diameter of the SITER 1600 for the depicted configuration corresponds to about one foot (0.30 m) for the illustrated example. The SITER 1600 includes an outer spherical shell 1610 and an inner chassis 1620. An optional communication and control unit 1625 can be disposed in the chassis 1620. The remote control unit 1625 can include a transmitter for sending signals from the sensors and/or a recording instrument to store such signals.

Alternatively, the receiver 1625 can be replaced by an autonomous navigation system using a processor that navigates independently of operator guidance, such as by collision-responding accelerometers to retreat and proceed in an alternate direction in response to an obstacle. An instrument support platform 1630 includes a cage structure 1635 for securing instruments mounted therein. Artisans of ordinary skill will recognize that the physical size shown is merely exemplary and that other dimensions can be selected for a mission-appropriate spherical vehicle without departing from the scope of the claims.

The platform 1630 supports a plurality of infrared sensors 1640, such as infrared cameras for visual imaging of objects that emit or reflect electromagnetic radiation in the near infrared spectrum (wavelengths between 0.9 μm and 1.7 μm). For various exemplary embodiments, a quartet of four such cameras 1640 can be arranged in a cruciform to point in, and thereby capture images from four separate directions. The cameras 1640 include a forward unit 1641, an aft unit 1642, a starboard unit 1643 and a port unit 1644 (obscured behind the starboard unit). The control unit 1625 is shown disposed between the cameras 1640, although other design arrangements may be considered as optional configurations for these embodiments.

For such uses, the shell 1610 would preferably be composed of silicon (Si), which is substantially transparent in the infrared portion of the electromagnetic spectrum. The cameras 1640 can be replaced with an alternative sensor suite depending on intended reconnaissance or investigative purpose, such as chemical detectors, audio detectors, visual detectors, etc. For such purposes, the robotic shell 1610 can be composed of a rigid material for road travel, such as carbon phenolic, thermoset plastic or ceramic. Alternatively, the shell 1610 can be composed of a flexible material, such as polyvinyl chloride to enable commanded inflation and deflation of the spherical shell.

Each camera unit includes an aperture lens 1645 for receiving infrared emissions. The chassis 1620 can include apertures aligned with the lenses 1645 to permit imaging. Alternatively, the chassis 1620 can comprise material transparent at near infrared wavelengths, such that the chassis forms a substantially integral aperture that encompasses that structure. Artisans of ordinary skill will recognize that the four cameras 1640 shown in cruciform pattern are merely exemplary as sensors and not limiting, either by quantity, arrangement or sensor type. The cage 1635 secures the cameras 1640 from lateral displacement while offering views unobstructed by the cage's structural elements.

The near infrared (NIR) thermal infrared imager by Infrared Cameras Incorporated (ICI) of Beaumont, Tex. 77705 represents an exemplary camera 160 for purposes of an infrared imaging sensor in the SITER 1600. The NIR imager incorporates an indium gallium arsenide (InGaAs) detector with a 320×256 array format at a 30 Hz frame rate in snapshot mode. The NIR imager has a spectral response between 0.9 µm and 1.7 µm and uses power input of 6 volts DC supplied by a 2.00 mm jack. Each NIR imager has length, width and height of 3.7"×2.5"×2.1" (94 mm×63.5 mm×53.3 mm) and a mass of 12.4 oz (350 g) without the lens.

The NIR imager employs RS232 protocol for communication and uses passive convection cooling. The NIR imager operates with typical power dissipation of 3 W, and is resistant to laser blinding. The quartet of cameras 160 mounted in cruciform pattern on the platform 1630 provide views substantially perpendicular to each other, facing slightly upward (e.g., zenith of about 5° to) 10°, extends about 10 inches (0.25 m). The SITER 1600 can be contained within the one-foot diameter ball for the exterior shell 1610. Artisans of ordinary skill will recognize that alternative infrared sensors or other imagers can be sub-situated for the cameras 1640 without departing from the scope of the invention.

Optionally, an adjustable trim ballast 1650 slides along a longitudinal rail 1655 mounted on the platform 1630 to shift center-of-gravity, such as when additional momentum may be necessary to traverse an obstacle, such as a depression in the road being traveled and/or to tilt the platform 1630. The ballast 1650 can also serve as a parking brake to balance the SITER 1600 in a neutral position during stowage.

A tractor drive system 1660 and an overhead compression wheel system 1661 separate the chassis 1620 from the shell 1610. The tractor drive 1660 includes a starboard tread assembly 1662, a frame 1663, and starboard wheels for drive 1664, idler 1665 and tension 1666. A starboard motor 1667 delivers torque to the drive wheel 1664. The overhead compression assembly 1661 includes a starboard compression wheel 1668. The starboard drive wheel 1664 rotates in a clockwise direction 1669 for forward locomotion. An electrical package 1670 (shown within the chassis 1620) supplies power to the motor 1667. The electrical package 1670 can include chemical batteries, including commercially available types connected in series.

FIGS. 6B and 6C respectively present the elevation view 640 from the front and the plan view 660 from above. The tractor drive 1660 further includes a port tread assembly 1672, a frame 1673, and port wheels for drive 1674, idler 1675 and tension 1676. A port motor 1677 powered by the electrical package 1670 delivers torque to the drive wheel 1674. The overhead compression assembly 1661 also includes a port compression wheel 1668. The port drive wheel 1674 rotates in a clockwise direction 1679 for forward locomotion (in conjunction with the starboard drive wheel 1664). An antenna 1680 enables signal reception by the control unit 1625. The operation of the SITER's tractor drive system 1660 substantially conforms to descriptions provided for the SNORT's tractor drive system 1400, with the substantial difference in scale, such that the exemplary wheels for the SITER 1600 each have a diameter of about two inches (5.1 cm).

An exemplary type of battery for the electrical package 1670 that could be suitable would be the 2200-series Nickel-Cadmium (NiCad) cells provided by SR Batteries Inc. at Box 287, Bellport, N.Y. 11713. Each cell has a 0.9 inch (23 mm) diameter and 1.69 inch (43 mm) length weighing 2.1 oz (60 g) producing 1.25 volts DC at 2.2 amp-hours and with 5Ω impedance. Six such NiCad cells can be arranged as three abreast at one diameter high and two across to produce 7.5 volts DC (with voltage regulation to the NIR imager supply requirements).

As mentioned, the unit 1625 can include either a transceiver for receiving instructions from an operator and transmitting image signals for reconnaissance, or else a recorder to store such images for subsequent retrieval. An operator can optionally control the SITER 1600 by issuing radio commands to the unit 1625 via a remote control input device, such as used for model aircraft. Alternatively, the unit 1625 can be equipped with an internal processor to enable autonomous locomotion and/or a global positioning system (GPS) receiver for navigating to a preselected destination.

The electrical package 1670 may include NiCad batteries, although other forms of electrical power storage may alternatively be incorporated for the SITER 1600. The chassis 1620 can include apertures that provide a portal for the lenses 1645 through which to view external infrared images. The apertures can constitute vacant openings or else a transparent cover.

FIG. 6C presents a plan view 660 of the SITER 1600. The cruciform arrangement of the cameras 1640 includes the forward 1641, aft 1642, starboard 1643 and port 1644 units, with the communication-and-control unit 1625 disposed therebetween. The tractor drive 1660 under the chassis 1620 includes the tractor drive system 1660 with the drive wheels 1664 and 1674, as well as the idler wheels 1665 and 1675, and other related components shown in dash lines as being obscured by the cameras 1640 and the control unit 1625.

FIG. 7A presents another elevation view 700 showing the outside of the SITER 1600. An optional set of compressible elastic buttons 1710 are arranged along the exterior surface of the shell 1610. In various exemplary embodiments, an arrangement based on Buckminster fullerene geometry can serve to dispose the positions of the buttons 1710, as indicated by lines 1720 that denote the outlined hexagonal and pentagonal shapes that form the geodesic pattern. As an alternative shell 1610 can include cilia 1730 to serve as flagella or paddles to move on a liquid surface, such as water as a round buoy.

The chassis 1620 can be composed of lightweight material with sufficient structural strength to support an estimated twenty pounds mass, including cameras 1640 and attached tractor drive 1660. Apertures aligned with the cruciform axes can be incorporated to avoid blocking infrared radiation to the camera lenses 1645. Alternatively, the chassis 1620 can be composed of material substantially transparent in the near infrared spectrum to encompass an integral aperture for the cameras 1640. The shell 1610 can be composed of an appropriate material substantially transparent in the near infrared spectrum, such as alumina. With an estimated shell mass of about thirteen pounds, the one-foot diameter SITER 1600 for the configuration shown can be estimated to have a total mass of about thirty-five or forty pounds (16-18 kg).

Such infrared transparent materials include, but are not limited to, aluminum oxide ($Al_2O_3$, including the alpha-crystalline state called sapphire), magnesium fluoride ($MgF_2$), calcium fluoride ($CaF_2$), barium fluoride ($BaF_2$) and possibly silicon (Si). Optionally, a coating produced by diamond vapor deposition can be applied to the exterior surface to reduce surface wear on the shell 1610.

In particular, alumina (aluminum oxide) at 5 mm thickness (0.2 inch) has transparencies at least sixty-percent for wavelengths exceeding $\lambda > 1.3$ µm and about eight-percent for wavelengths around $\lambda > 2.3$ µm. Alumina has an index of refraction of about $n \approx 1.8$ and a density of about 250 lb/ft$^3$ (4 g/cm$^3$). An alumina shell with a thickness of 0.2 inch has a mass of about 13 pounds (5.8 kg).

Although the thickness of the shell material and spherical lens focus distortion may degrade optical quality from ideal imagery, field intelligence can sometimes benefit from even marginal reconnaissance resolution in regions of operationally difficult or problematic access. Moreover, infrared cameras 1640, typically intended to detect small temperature differentiation, can be adequate for determining presence of endothermic creatures or other indications of interest even with degraded optical conditions.

The SITER 1600 can thereby aid in the collection of visual field intelligence, such as within an urban area, especially under low visibility conditions with considerable agility. Due to its high relative speed and maneuverability compared to other robotic platforms, the SITER 1600 can accomplish such local ground-level reconnaissance missions, preferably without detection, but minimally without exposing military personnel to hostile attack. An alternate configuration for pipe diagnostics can replace cameras with chemical detectors and/or audio sensors, for investigation of pipe leaks. The remote control system can optionally be replaced with an autonomous navigation system based on inertial guidance or GPS signals.

FIGS. 8A and 8B provide isometric views 800 of the starboard side of the tractor drive 1400. A starboard side 1810 of the frame 1430 is shown in outline for geometric reference. The starboard track 1420 is shown with distributed internally facing alignment ridges or chines 1820 that can be received by an annular groove 1825 of each starboard wheel, including the drive wheel 1440, the idler wheel 1450 and the tension wheel 1460. In FIG. 8A, the starboard drive wheel 1440 includes radially extending sprocket teeth 1830, shown in this configuration in pairs straddling the groove 1825. Note that this configuration also applies to the port side as well.

In FIG. 8B, the tension wheel 1460 is replaced by an alternate suspension assembly, with a truck box 1840 that attaches to the frame 1430 and supports an arm 1850 that rotatably connects first and second bogie wheels 1860 and 1870, for example. The truck box 1840 can include springs to reduce shock from the shell 1500 encountering uneven terrain. The bogie wheels 1860 and 1870 also include grooves 1825 for receiving the chines 1820 as the track 1420 rolls past. Artisans of ordinary skill will recognize that the number and configuration of bogie wheels 1860 and 1870 are exemplary and not limiting.

FIG. 8C features an isometric detail view 810 of track linkage components. Tread plates 1880 are separated longitudinally by gaps 1885. Each plate 1880 has an outer obverse side (shown in view 800) and an inner reverse side (shown in view 810). Each chine 1820 extends substantially normal from the reverse side of the associated link 1880. Links 1890 pivotably connect the plates 1880 together at their ends between the corresponding gaps 1885. Associated pins 1895 extending through the plates 1880 provide the pivoting mechanisms to secure the tracks 1420 and 1425. The sprocket teeth 1830 on the drive wheels 1440 and 1445 pass into corresponding gaps 1885 as wheels rotate over the plates 1880 and the chines 1820 align with the grooves 1825.

While certain features of the embodiments of the invention have been illustrated as described herein, many modifications, substitutions, changes and equivalents will now occur to those skilled in the art. The afore-described dimensions and mass properties constitute an example to demonstrate a practical utility and are not limiting. It is, therefore, to be understood that the appended claims are intended to cover all such modifications and changes as fall within the true spirit of the embodiments.

What is claimed is:

1. A spherical tractor operating mobile platform (STOMP) for internally propelling and steering along an external surface, said STOMP comprising:
   a spherical shell having interior and exterior surfaces, said exterior surface being disposable on the external surface,
   an internal chassis containing an electrical power supply and a propulsion controller;
   a tractor drive system for propelling and steering said shell along the external surface, said drive system including a frame that connects to said chassis from below and containing a motor unit, said frame having port and starboard sides that support respective wheel sets surrounded by corresponding continuous tracks that engage said interior surface of said shell, each wheel set including a drive wheel, an idler wheel and a tension wheel for engaging a corresponding track; and
   an overhead wheel assembly that connects to said chassis from above to maintain said chassis and said drive system in compression with said shell,
   wherein said propulsion controller commands said motor unit provide torque to at least one of both said port and starboard drive wheels for propulsion of said shell, said port drive wheel for steering said shell towards starboard, and said starboard drive wheel for steering said shell towards port.

2. The STOMP according to claim 1, wherein said motor unit includes starboard and port motors for providing torque to respective said port and starboard drive wheels, said propulsion controller providing independent commands to said motors.

3. The STOMP according to claim 1, wherein said motor unit includes a motor and a distributed differential gear system for selectively providing torque to said port and starboard drive wheels.

4. The STOMP according to claim 1, wherein said tension wheel in said each set comprises a truck that connects to said frame and a bogie wheel that connects to said truck.

5. The STOMP according to claim 1, wherein each continuous track includes plates having corresponding external and internal faces, each plate connects at corners of one end to an adjacent plate by pivotable links with a gap therebetween.

6. The STOMP according to claim 5, wherein said each plate includes a chine that extends substantially normal from said internal face, and each said wheel includes an annular groove into which said chine passes through.

7. The STOMP according to claim 5, wherein said port and starboard drive wheels include radially extending sprocket teeth for engaging gaps between adjacent links of said corresponding track.

8. The STOMP according to claim 1, wherein said shell comprises a substantially rigid material for ground terrain locomotion.

9. The STOMP according to claim 1, wherein said shell comprises a substantially flexible material for water surface locomotion, said shell having externally protruding cilia for paddling.

10. The STOMP according to claim 9 wherein said shell is controllably inflatable and deflatable.

11. A spherical navigatable ordnance resistance tractor (SNORT) for operating on an external surface with at least one operator, said SNORT comprising:

a spherical shell having interior and exterior surfaces, with a plurality of cavities extending therethrough, said exterior surface being disposable on the external surface;

an armored cockpit that houses a seat, a guidance controller, a display console, and an electric motor connected to a power supply, said cockpit being contained within said shell, said seat able to receive the operator;

a tractor drive system for propelling and steering said shell along the external surface, said drive system including a frame that connects to said cockpit from below and containing a motor unit, said frame having port and starboard sides that support respective wheel sets surrounded by corresponding continuous tracks that engage said interior surface of said shell, each wheel set including a drive wheel, an idler wheel and a tension wheel for engaging a corresponding track; and an overhead wheel assembly that connects to said cockpit from above to maintain said cockpit and said drive system in compression with said shell, wherein said propulsion controller commands said motor unit provide torque to at least one of both said port and starboard drive wheels for propulsion of said shell, said port drive wheel for steering said shell towards starboard, and said starboard drive wheel for steering said shell towards port.

12. The SNORT according to claim 11, wherein said cavities are disposed within three-sided boundaries of a geodesic dome.

13. The SNORT according to claim 11, further comprising:
a plurality of optical sensors disposed on said cockpit; and
a signal integrator to present temporally concatenated visual signals into a mosaic at said display console.

14. The SNORT according to claim 11, further comprising:
a gun mounted to said cockpit, said gun capable of firing a projectile; and
a trigger control to enable actuation of said gun in response to said projectile exiting said sphere at an instance that coincides with a cavity of said plurality of cavities.

15. The SNORT according to claim 11, wherein
said cockpit further includes a door that slides between first closed and open positions, and
said shell includes a hatch that hinges between a second closed position and a second open position beyond said exterior surface.

16. The SNORT according to claim 11, further comprising:
shiftable trim ballast; and
a translation mechanism for controllably moving said trim ballast, said mechanism being disposed longitudinally along said cockpit.

17. A Geodesic Rolling Operation Tractor (GRoOT) for operating on an external surface with at least one operator, said GRoOT comprising:

a spherical housing having a geodesic mesh pattern, said housing having interior and exterior surfaces, said exterior surface being disposable on the external surface;

an operation cage that houses a seat to receive the operator, an engine that provides torque, a transmission that transmits said torque, steering and drive controls, said cage being contained within said housing;

a tractor drive system for propelling and steering said housing along the external surface, said drive system including a frame that connects to said cage from below, said frame having port and starboard sides that support respective wheel sets surrounded by corresponding continuous tracks that engage said interior surface of said shell, each wheel set including a drive wheel, an idler wheel and a tension wheel for engaging a corresponding track; and an overhead wheel assembly that connects to said cage from above to maintain said cage and said drive system in compression with said housing, wherein said transmission delivers said torque to at least one of both said port and starboard drive wheels for propulsion of said housing, said port drive wheel for steering said housing towards starboard, and said starboard drive wheel for steering said housing towards port.

18. A spherical internal tractor excursion robot (SITER) for internally propelling and steering along an external surface, said SITER comprising:

a spherical shell having interior and exterior surfaces, said exterior surface being disposable on the external surface, an internal chassis containing an electrical power supply, a propulsion controller, and a sensor system;

a tractor drive system for propelling and steering said shell along the external surface, said drive system including a frame that connects to said chassis from below and containing a motor unit, said frame having port and starboard sides that support respective wheel sets surrounded by corresponding continuous tracks that engage said interior surface of said shell, each wheel set including a drive wheel, an idler wheel and a tension wheel for engaging a corresponding track; and an overhead wheel assembly that connects to said chassis from above to maintain said chassis and said drive system in compression with said shell, wherein said propulsion controller commands said motor unit provide torque to at least one of both said port and starboard drive wheels for propulsion of said shell, said port drive wheel for steering said shell towards starboard, and said starboard drive wheel for steering said shell towards port, said sensor system includes at least one of infrared cameras, chemical detectors, and acoustic sensors, and said controller includes at least one of a radio remote control transceiver, a GPS receiver, an inertial navigator, and obstacle detection accelerometers.

* * * * *